(12) United States Patent
Mathur

(10) Patent No.: US 6,486,883 B1
(45) Date of Patent: Nov. 26, 2002

(54) APPARATUS AND METHOD FOR UPDATING IMAGES STORED IN NON-VOLATILE MEMORY

(75) Inventor: Sameer Mathur, San Jose, CA (US)

(73) Assignee: Phoenix Technologies, Ltd., San Jose, CA (US)

( * ) Notice: Subject to any disclaimer, the term of this patent is extended or adjusted under 35 U.S.C. 154(b) by 0 days.

(21) Appl. No.: 09/336,356

(22) Filed: Jun. 18, 1999

(51) Int. Cl.$^7$ .............................................. G06F 12/10
(52) U.S. Cl. ...................................... 345/568; 711/202
(58) Field of Search ........................ 345/568, 564–567, 345/520, 501, 733; 711/200, 202, 203, 206, 208, 209; 703/27

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,459,825 A * | 10/1995 | Anderson et al. ........... 345/815 |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,574,944 A * | 11/1996 | Stager ........................ 711/153 |
| 5,581,740 A | 12/1996 | Jones |
| 5,586,327 A | 12/1996 | Baelkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,708,790 A * | 1/1998 | White et al. ................. 711/203 |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |

(List continued on next page.)

Primary Examiner—Kee M. Tung

(57) ABSTRACT

A method and apparatus is described in which a firmware causes display of a graphical screen with various images that are stored in a non-volatile memory wherein the images may be selectively updated. A memory is configured into a plurality of memory segments wherein each memory segment has a predetermined address thereby allowing the segment to be selectively addressed. A circuit is able to configure a display template having a plurality of display sections on a display wherein data stored in the mentioned memory segments is displayed on a predetermined display section.

20 Claims, 9 Drawing Sheets

U.S. PATENT DOCUMENTS

| | | |
|---|---|---|
| 5,805,882 A | 9/1998 | Cooper et al. |
| 5,815,706 A | 9/1998 | Stewart et al. |
| 5,819,063 A * | 10/1998 | Dahl et al. .................. 703/27 |
| 5,828,888 A | 10/1998 | Kozaki et al. |
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 5,978,900 A * | 11/1999 | Liu et al. .................. 711/208 |
| 6,182,134 B1 * | 1/2001 | Collins et al. .............. 345/733 |
| 6,211,875 B1 * | 4/2001 | Lin et al. .................. 345/347 |
| 6,304,272 B1 * | 10/2001 | Schanel et al. ............. 345/676 |

* cited by examiner

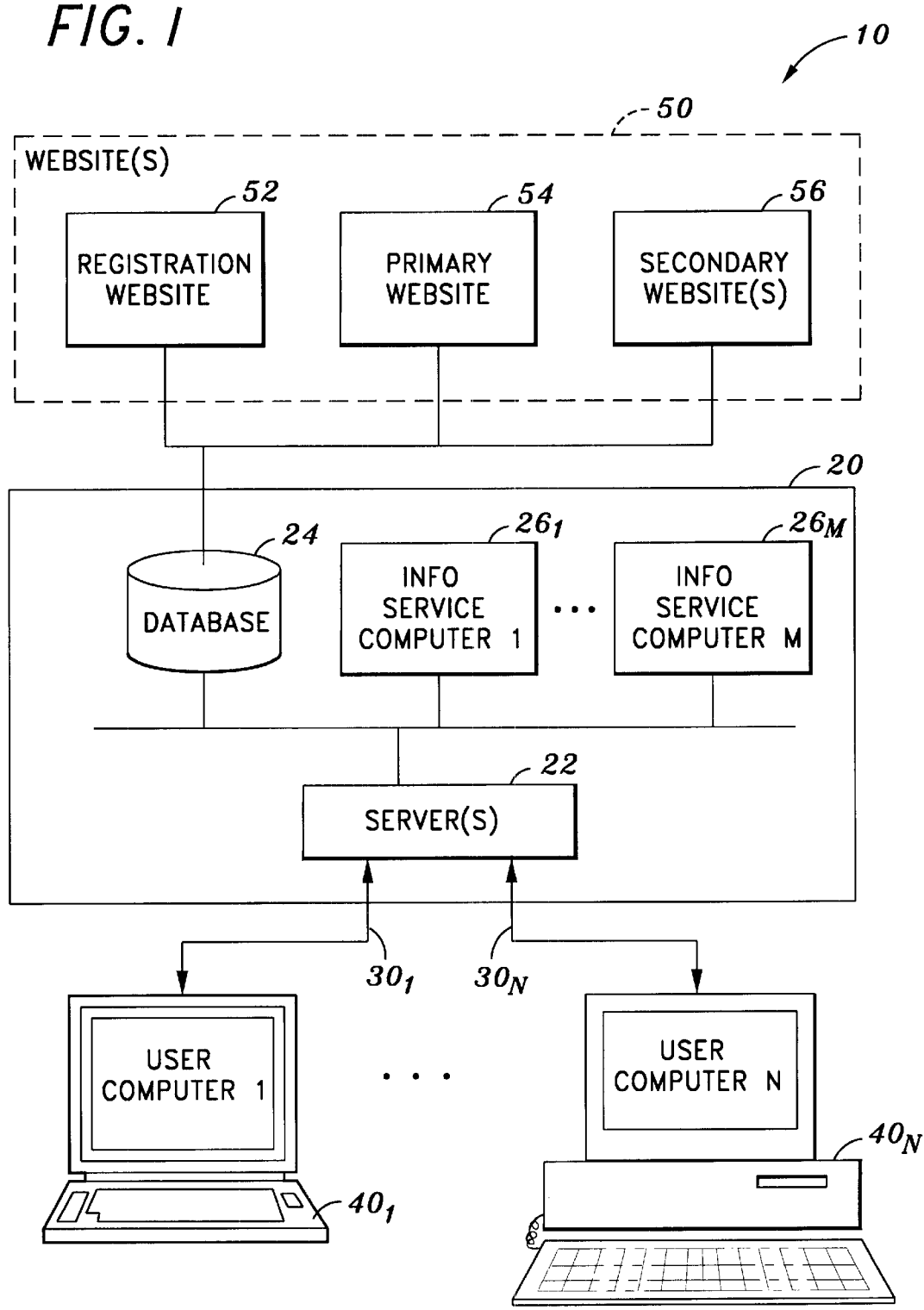

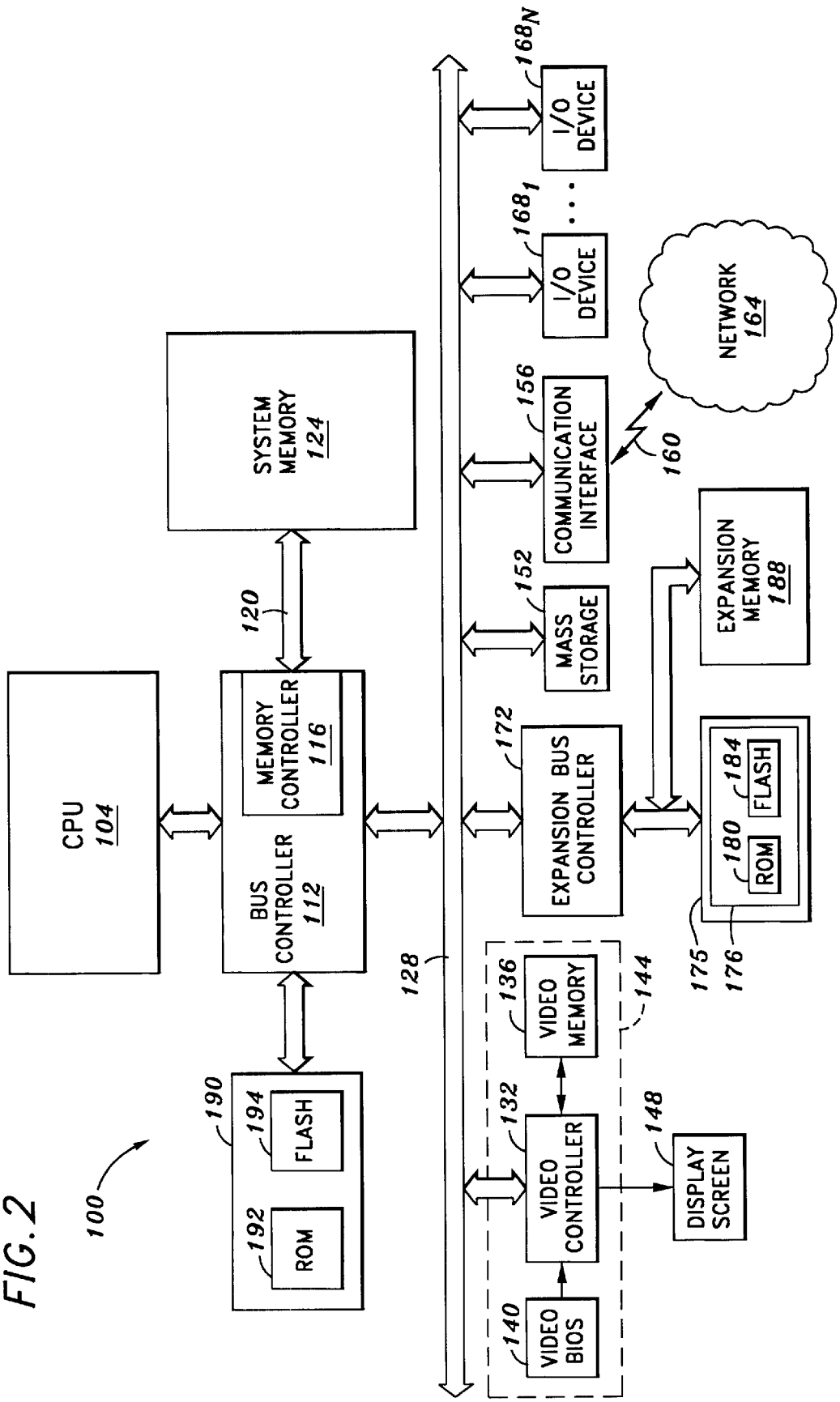

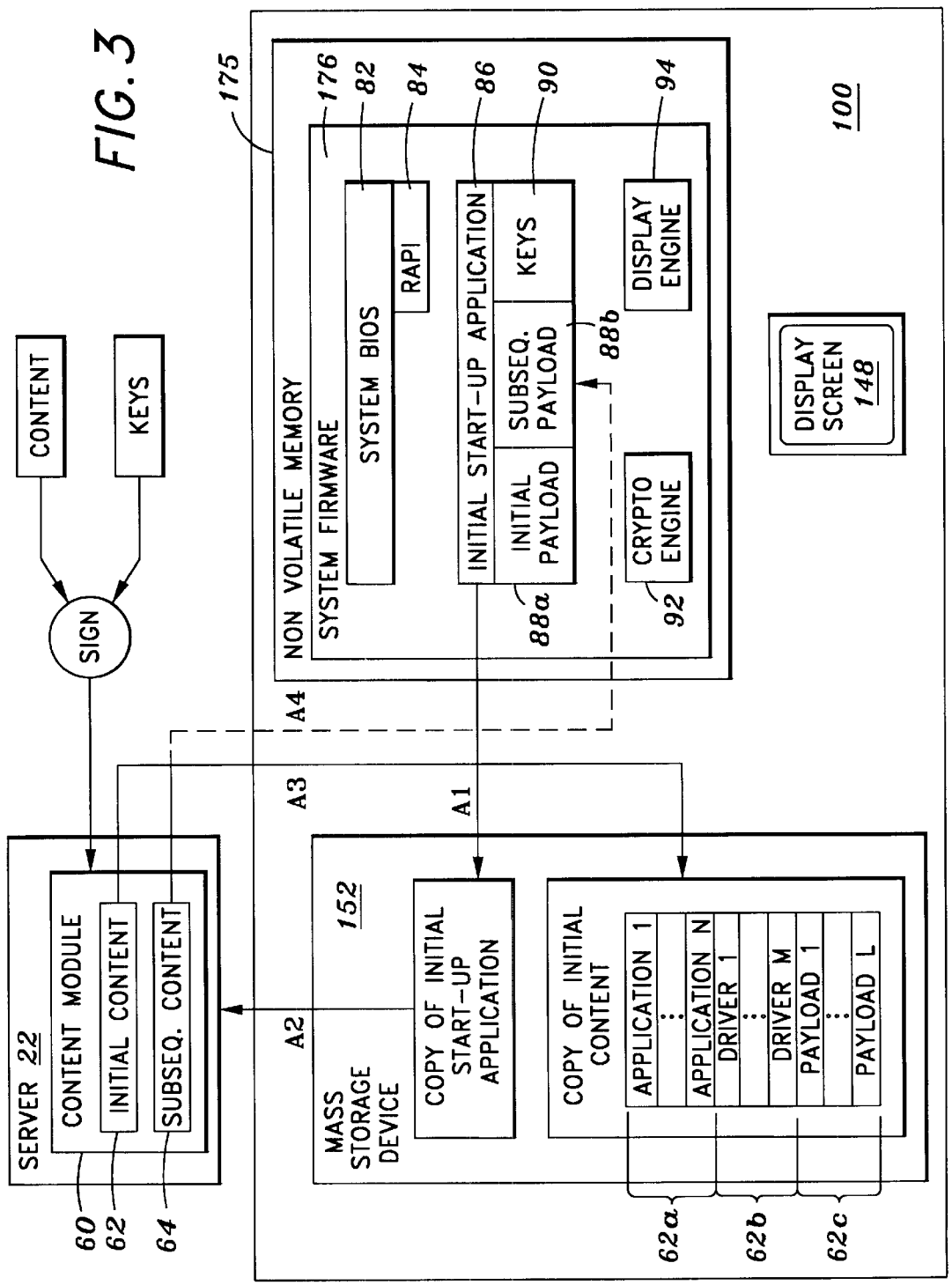

APPARATUS AND METHOD FOR UPDATING IMAGES STORED IN NON-VOLATILE MEMORY

BACKGROUND

1. Field of the Invention

The present invention relates generally to processor-based systems, and more particularly, to a method and apparatus of selectively updating images stored in a non-volatile memory.

2. Background

The increasing use of computers in collecting and distributing information has revealed various problems with the typical collection and distribution channels. For example, one current software distribution system enables the software vendor to provide a number of users with software over a network. The system also enables the vendor to update and maintain the software at the request of the users and to enable the users to acquire software at the users' requests from different software vendors over the network. However, such a system only provides software and related services at the request of the user, without considering the user's requirements or preferences. As a result, the system is not optimized for the user's specific needs and/or preferences.

In addition, information of interest to the user is currently provided to the user in the form of messages displayed on the computer monitor after the operating system has been booted up and is operational. Such information or messages are typically provided to the user arbitrarily post boot or displayed on the monitor when the system is idle.

Accordingly, there is a need in the technology for a method and system for collecting and distributing information over a network that is optimized for the user's needs and/or preferences.

SUMMARY

A method and apparatus is described in which a firmware causes display of a graphical screen with various images that are stored in a non-volatile memory wherein the images may be selectively updated. A memory is configured into a plurality of memory segments wherein each memory segment has a predetermined address thereby allowing the segment to be selectively addressed. A circuit is able to configure a display template having a plurality of display sections on a display wherein data stored in the mentioned memory segments is displayed on a predetermined display section.

Additional features, embodiments, and benefits will be evident in view of the figures and detailed description presented herein.

BRIEF DESCRIPTION OF THE DRAWINGS

FIG. 1 is a system block diagram of one embodiment of an information distribution system in which the apparatus and method of the invention is used;

FIG. 2 illustrates an exemplary processor system or user computer system which implements embodiments of the present invention;

FIG. 3 illustrates a logical diagram of one embodiment of the invention;

DETAILED DESCRIPTION

Figure 4A:
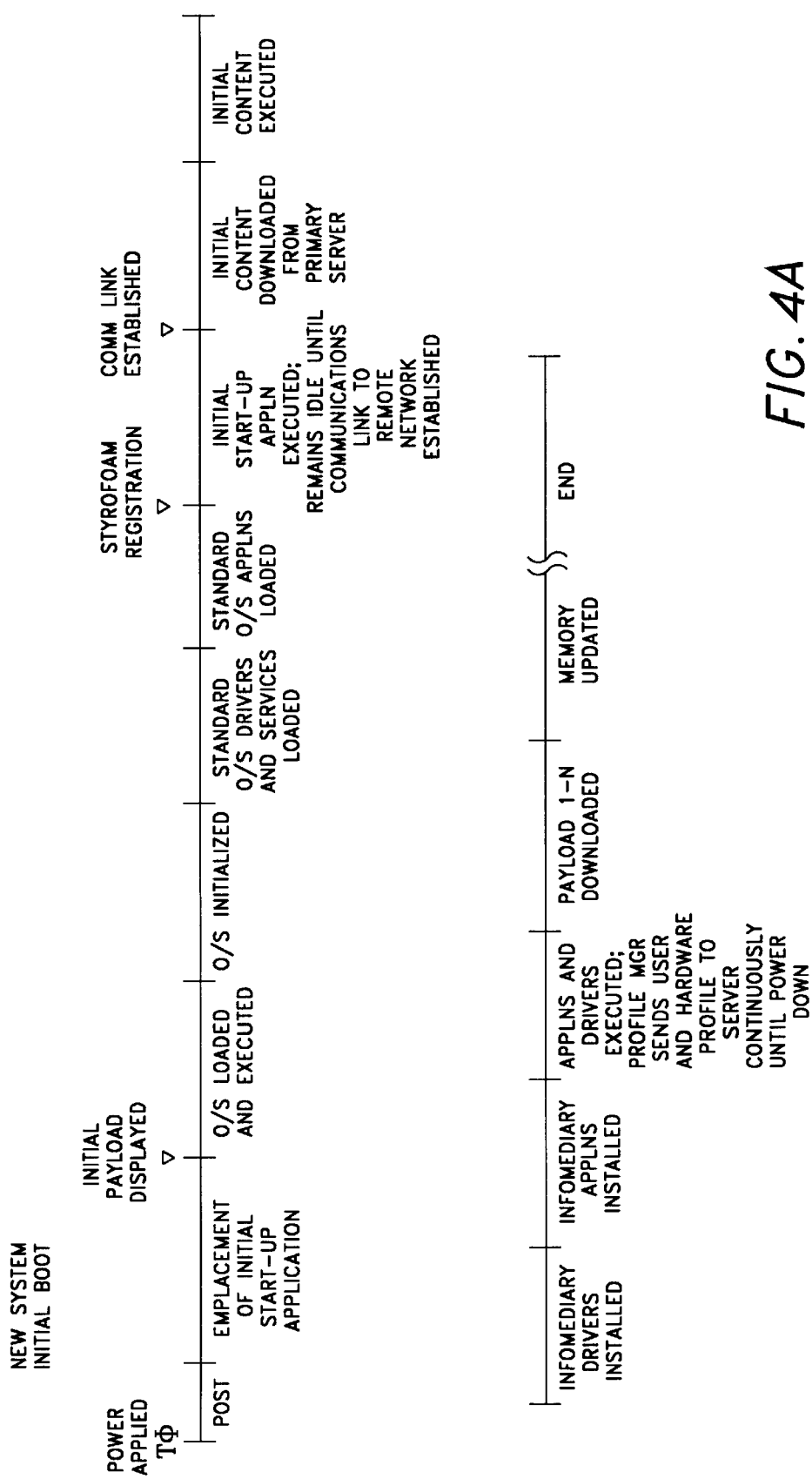
FIGS. 4a and 4b illustrate one embodiment of a process flow chart provided in accordance with the principles of the invention.

A method and apparatus is described in which according to an embodiment of the invention, a firmware causes display of a graphical screen with various images that are stored in a non-volatile memory. For example, one of the images may include a logo and text related the manufacturer or vendor of the computer. Another image causes the display of system status and configuration such as available disk space, number and type of input/output (I/O) ports, amount of random access memory (RAM), central processing unit (CPU) type and speed and so forth. In accordance with the embodiment of the invention, several images are related to products and services offered by various entities. Entities are able to display images on the screen which are divided into a number of display sections. In a further embodiment, at predetermined intervals and/or events, the images may be selectively modified, updated or upgraded.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins.

OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), that will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers is used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer 26₁, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O device $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable drive, a low capacity media device, and/or any combination thereof. The expansion bus controller 172 is coupled to nonvolatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88a may each be separately developed and stored in the system firmware 176 prior to initial use of the computer system 100. In one embodiment, the RAPI 84, ISUA 86, and initial payload 88a each includes proprietary software developed by Phoenix Technologies, Ltd. RAPI 84 provides a secure interface between ROM application programs and system firmware 176. One embodiment of RAPI 84 is described in co-pending U.S. patent application Ser. No. 90/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,789 entitled "Method and Apparatus for Automatically Installing and Configuring Software on a Computer," filed on Jun. 18, 1999, assigned to Phoenix Technologies, Ltd., and which is incorporated herein by reference.

Figure 4B:
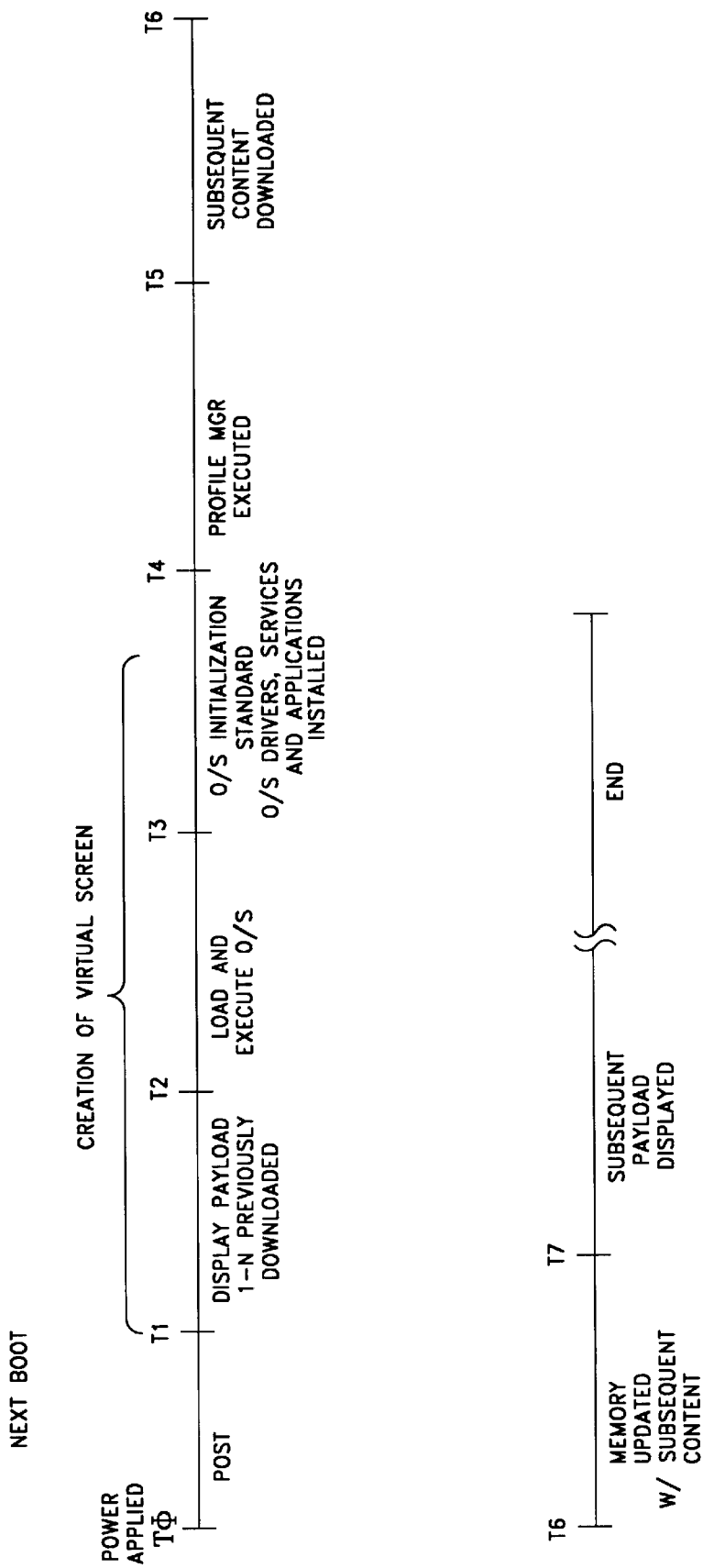

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. Patent Continuation-in-Part application Ser. No. 09/336,307 entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users that have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated.

In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Window™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension". BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Figure 5:
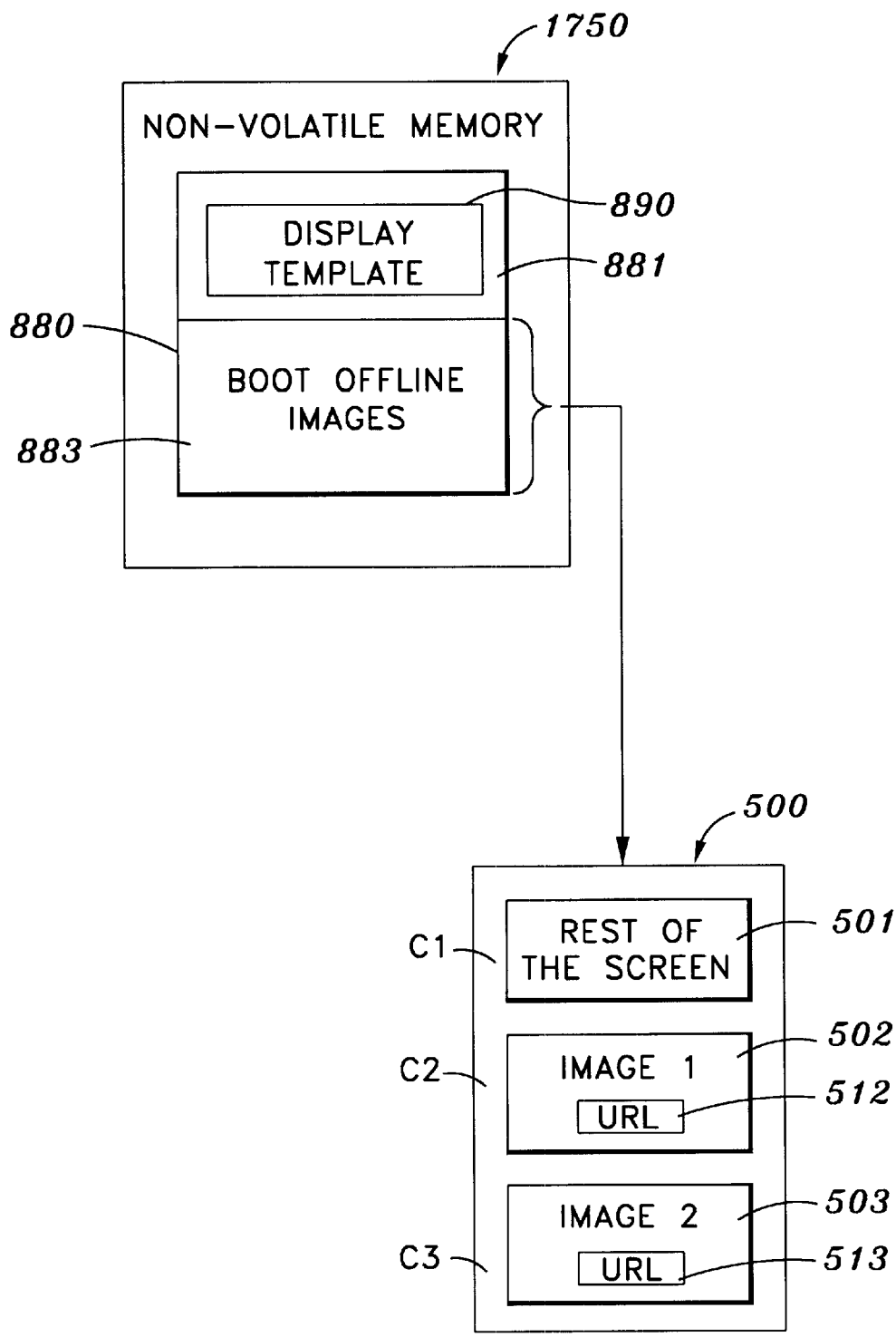
FIG. 5 illustrates a more detailed logical diagram of a memory configuration in accordance with an embodiment of the invention.

FIG. 5 illustrates a more detailed logical diagram of a payload 880 in accordance with an embodiment of the invention that is stored in the non-volatile memory 1750. As will be described further below, the payload 880 is configured as to allow one or more images 501–503 stored in the payload 880 to be selectively updated. The images may be graphics and/or informational material (articles, stock quotes, etc.), and the like. In one embodiment, the payload 880 comprises a first section 881 that includes a display template 890 and a second section 883 that includes the images 501–503 to be displayed on the display screen 148 (see FIG. 3) using the display template 890. The images 501–504 may also be connected to corresponding Uniform Resource Locators (URLs) 512–513 which allow a link to a web site over the Internet should further information related to a corresponding image is subsequently requested. The sections 881, 883 are interrelated as shown in the table 1 below.

TABLE 1

| Stored Items | Description |
| --- | --- |
| Display Template | Data structure used by display engine to format the display and the association of locations to Text and Bitmap objects. |
| Text Object 1 | Message Displayed |
| Text Object 2 | Message displayed |
| Bitmap Object 1 | First logo |
| Bitmap Object 2 | Second logo |
| Bitmap Object 3 | First ad |
| Bitmap Object 4 | Second ad |
| URL object number 3 | URL associated with selection of bitmap #3, ie ad #1 |
| URL object number 4 | URL associated with selection of bitmap #4, ie ad #2 |

The display template 890 comprises a plurality of display sections wherein each display section corresponds to one of the images stored in the second section 883 of the payload 880. For example, the display template 890 may have six display sections (see FIG. 6) that correspond to text object 1, text object 2, bitmap object 1, bitmap object 2, bitmap object 3 and bitmap object 4 as shown on table 1. Once the images are displayed, those images (e.g., bitmap object 3 and bitmap object 4) having links though the Internet have corresponding URLs (e.g., URL object number 3 and URL object number 4) which allow the user to obtain further information.

In one embodiment, the second section 883 is a memory 500 having a plurality of memory segments C1–C3 for storing the various images 501–503. In one embodiment, display sections having fixed images in the display screen that do not get modified or updated are stored in one memory segment. Images that are subject to modifications or updates are stored individually in each memory segment. Each memory segment is assigned a set of addresses that identifies the segment. As shown in the figure, the memory segments C1–C3 correspond to the following assigned addresses:

C1 is located from address A to address B
C2 is located from address B to address C
C3 is located from address C to address D Using a particular assigned set of addresses, an image stored within a particular memory segment may be modified or updated. Thus, assuming the memory 500 in which the images are stored is a flash memory, the targeted stored image is updated by "flashing" the updating image into the assigned set of addresses. For example, if the image in memory segment C2 is to be updated, the updating image is flashed into the memory from address B to address C.

Figure 6:
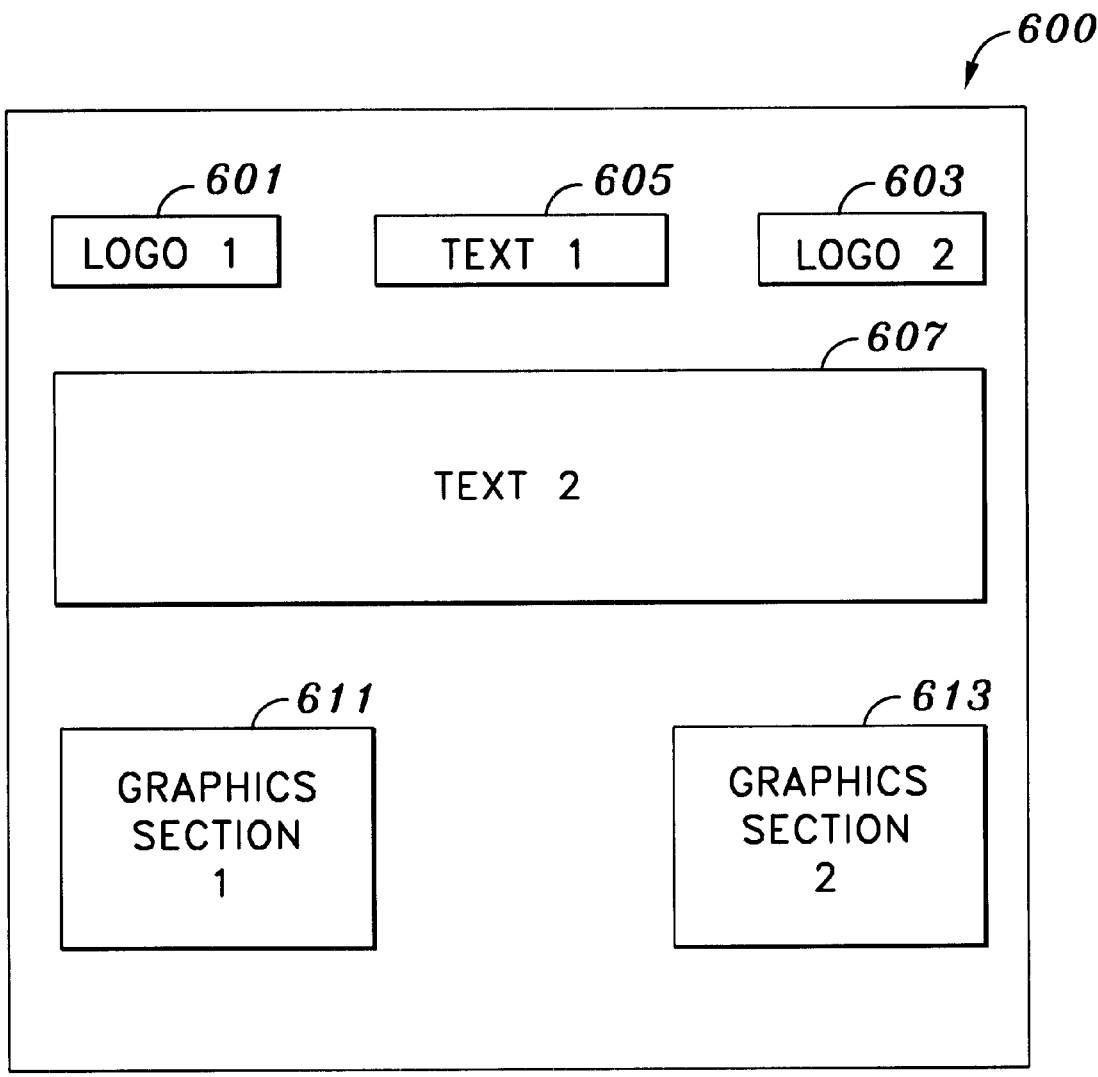
FIG. 6 illustrates an exemplary display template in accordance with an embodiment of the invention.

FIG. 6 is an example of a display template 600 in accordance with an embodiment of the invention. The display template 600 comprises a plurality of display sections that provide information to the user. In this example, the display template 600 comprises two logo sections 601, 603 that may display the trademark of the computer vendor or manufacturer and perhaps a compliance mark. The display template 600 further comprises a first text 605 that may display the name of the computer vendor or manufacturer, and a second text 607 that may display the status information of the computer such as CPU, amount of memory, available disk space and so forth. In accordance with an embodiment of the invention, the display template 600 further comprises a first graphics section 611 and a second graphics section 613 that display a plurality of images related to products and services offered by various advertisers, for example.

According to one embodiment, each display section 601, 603, 605, 607, 611, 613 on the display template 600 has a predetermined dimension, format and location. The display template format may be uniform for all installed system firmware in the various user computers $40_1$–$40_N$ (see FIG. 1). In this embodiment, the images to be displayed on the display template 600 are preformatted according to the dimensions of the display sections on the display template 600. By pre-formatting the images, one advantage is that all subsequent images transmitted from the server to the user computers $40_1$–$40_N$ need not be converted to a format suitable for the display sections before updating the previously stored images. Consequently, the subsequent images directly update the previously stored images. Alternatively, in an embodiment where the display template 600 is specific to the user computer, the received images are dimensioned according to the display section in the display template in which the image is to be displayed. Dimensioning is performed, for example, to prevent overlapping with other images that are displayed on the screen.

Referring to both FIGS. 5 and 6, according to one embodiment of the invention, a particular memory segment C1–C3 is linked to a particular display section or sections in the display template 600. For example, memory segment C1 may store images related to display sections 601, 603, 605, 607, 609 and the rest of the graphics screen. In this instance, the memory segment C1 stores a plurality of display sections because the images contained in those display sections are not subject to modification or update. Memory segments C2–C3 may store the images related to the graphics sections 611, 613 respectively. In this manner, images displayed in the graphics sections 611, 613 may be selectively updated by selectively updating the images stored in memory segments C2–C3.

Figure 7:
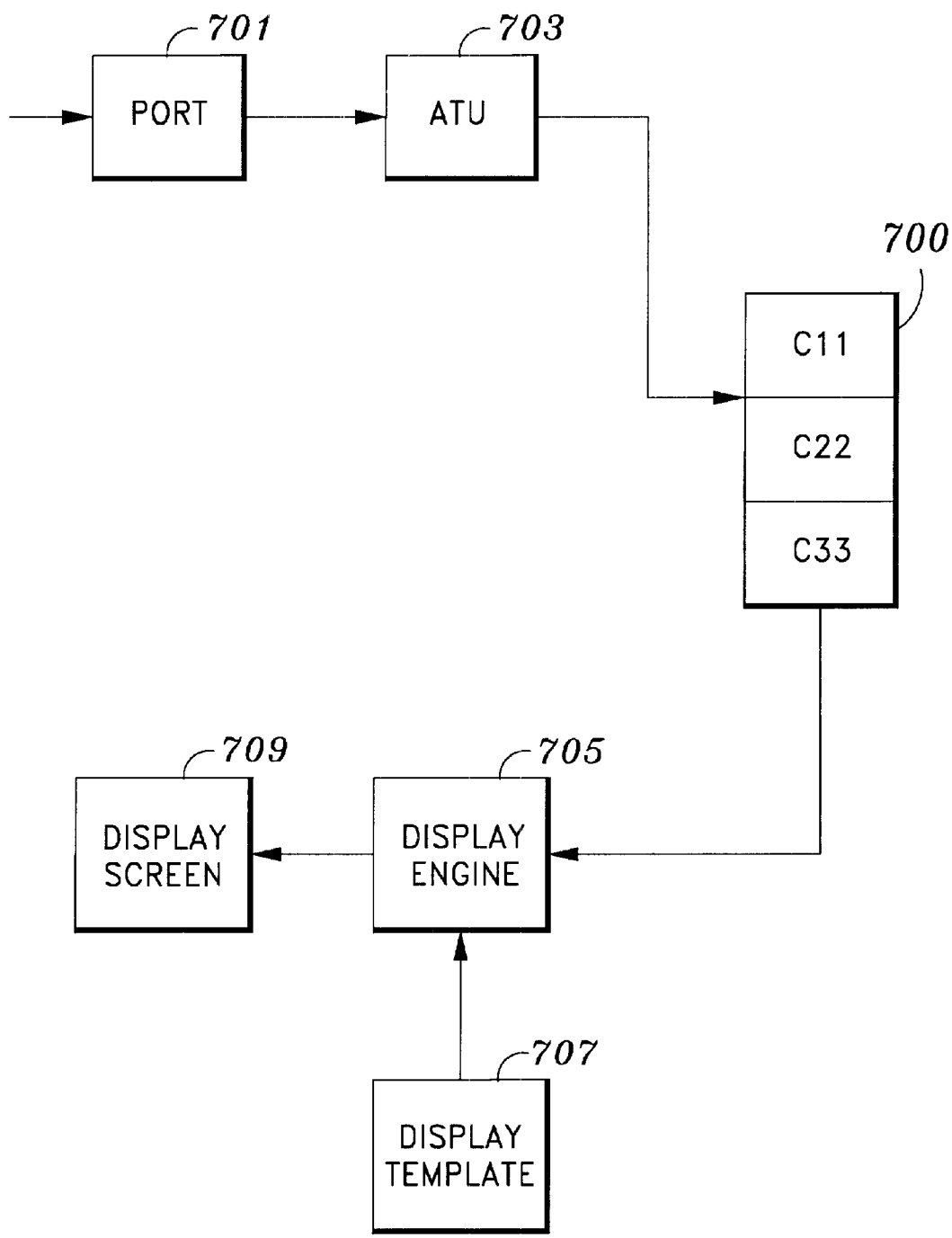
FIG. 7 illustrates a configuration for selectively updating an image in a memory in accordance with an embodiment of the invention.

FIG. 7 illustrates how the memory segments are linked to the display template in accordance with one embodiment of the invention. In one embodiment, the port 701 is a communication interface 156 (see FIG. 2) that is configured to receive an updating image or images from a transmitting source such as a primary server (see FIG. 3). The updating image includes a logical address that can be converted into a physical address. The address translation unit (ATU) 703 is configured to receive the logical address and convert the address into the physical address which, according to one embodiment, is the destination address of updating image in the memory 700. In the embodiment where the updating image is preformatted, the translated physical address is the starting address with the size of the image preformatted to fit into one of the memory segments C11–C33.

In one embodiment, the ATU 703 also functions as a display template. In this embodiment, the ATU 703 is able to determine the remaining addresses of the bits that make up the image from the starting address and size of the image. The ATU 703 translates the addresses of the image to be stored in the memory 700 such that the format in the memory 700 is the bitmap of the display screen 709. Thus, the display engine 705 is able to write to the display screen 709 displaying the various images by addressing the memory 700 sequentially. In another embodiment, a separate display template 707 is provided that is coupled to the display engine 705. The display template 707 contains the translation of the memory 700 addresses to the bitmap of the display screen 709. The display engine 705 uses the display template 707 to obtain the addresses in the memory that corresponds to the bitmap of the display screen in which the various images are to be displayed.

Figure 8:
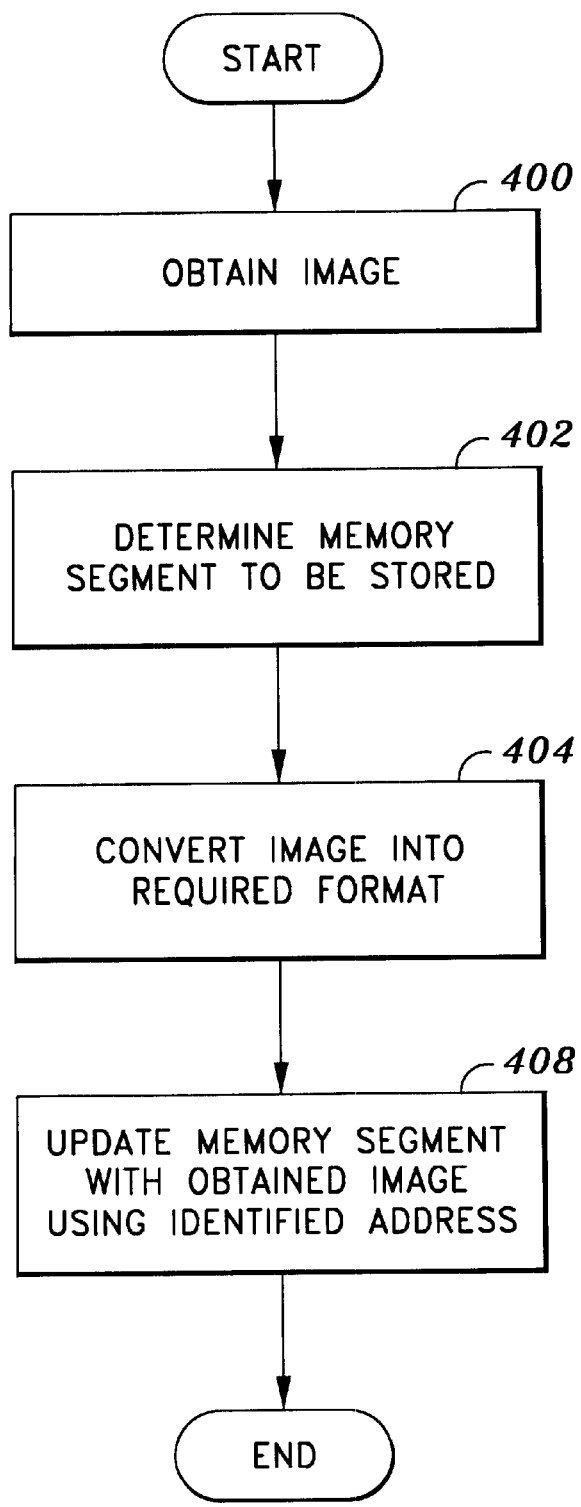
FIG. 8 is a flowchart the shows a method of selectively updating an image in a memory in accordance with an embodiment of the invention.

FIG. 8 is a flow chart for selectively updating stored images in a memory in accordance with an embodiment of the invention. As described above, the memory comprises a plurality of memory segments. In block 400, an image is received that is to update a stored image within the memory. In block 402, a determination is made as to which memory segment the updating image is to be stored. In one embodiment, an ATU translates the logical address accompanying the image into the physical address that points to the memory segment to be stored. In block 404, an optional translation may take place that translates the bit addresses of the image into addresses that correspond to the bitmap of the display screen (and thus correspond to the display template). In block 408, the converted image updates the previously stored image at the identified address in the memory segment.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. An apparatus comprising:
    a non-volatile memory including a plurality of non-volatile memory segments, each of said plurality of non-volatile memory segments having a predetermined address to allow selective access thereto;
    a first circuit for receiving an updating image to update an old image;
    a second circuit, coupled to said first circuit, for translating a logical address included in said updating image into a physical address corresponding to at least one of said predetermined addresses of said plurality of non-volatile memory segments;
    a third circuit for selecting one of the plurality of non-volatile memory segments based on said physical address;
    a fourth circuit, coupled to the non-volatile memory, for updating said one of the plurality of non-volatile memory segments with said updating image; and
    a fifth circuit adapted to configure a display template having a plurality of display sections on a display wherein said updating image stored in said one of the plurality of non-volatile memory segments is displayed on a predetermined display section.

2. The apparatus as in claim 1, further comprising an interface port adapted to receive said updating image through an internet.

3. The apparatus as in claim 1, wherein said second circuit includes an Address Translation Unit (ATU) to translate said logical address included in said updating image into a corresponding one of said predetermined addresses of said plurality of non-volatile memory segments.

4. The apparatus of as in claim 3 wherein said fourth circuit is adapted to store said updating image in said one of the plurality of non-volatile memory segments as a bitmap of said display.

5. A method comprising:
    receiving an updating image to update an old image;
    translating a logical address included in said updating image into a physical address;
    selecting one of a plurality of non-volatile memory segments based on said physical address;
    updating said one of the plurality of non-volatile memory segments with said updating image; and
    displaying said updating image stored in said one of the plurality of non-volatile memory segments on a predetermined display section on a display.

6. The method as in claim 5, further comprising:
    receiving said updating image from an internet.

7. The method as in claim 5, wherein updating said one of the plurality of non-volatile memory segment comprises storing said updating image in said one of the plurality of non-volatile memory segment as a bitmap of said display.

8. The method of claim 5, wherein said predetermined display section is linked to said one of the plurality of non-volatile memory segments.

9. The method of claim 5 wherein displaying said updating image comprises displaying, during a boot period, said updating image stored in said one of the plurality of non-volatile memory segments on the predetermined display section on the display.

10. A processor readable medium which, when executed by a processor, causes said processor to perform a method comprising:
    receiving an updating image to update an old image;
    translating a logical address included in said updating image into a physical address;
    selecting one of a plurality of non-volatile memory segments based on said physical address;
    updating said one of the plurality of non-volatile memory segments with said updating image; and
    displaying said updating image stored in said one of the plurality of non-volatile memory segments on a predetermined display section on a display.

11. The processor readable medium as in claim 10, further comprising:
    receiving said updating image from an internet.

12. The processor readable medium as in claim 10, wherein updating said one of the plurality of non-volatile memory segments comprises storing said updating image in said one of the plurality of non-volatile memory segments as a bitmap of said display.

13. A computer data signal comprising:
    a code segment to receive updating image to update an old image;
    a translate code segment to translate a logical address included in said updating image into a physical address;
    a selection code segment to select one of a plurality of non-volatile memory segments based on said physical address;
    an update code segment to update said one of the plurality of non-volatile memory segments with said updating image; and
    a display code segment to display said updating image stored in said one of the plurality of non-volatile memory segments on a predetermined display section on a display.

14. The computer data signal as in claim 13, further comprising a receive code segment to receive said updating image from an internet.

15. The computer data signal as in claim 13, wherein said update code segment to update said one of the plurality of non-volatile memory segments comprises a store code segment to store said updating image in said one of the plurality of non-volatile memory segments as a bitmap of said display.

16. A computer system comprising:

a processor;

a non-volatile memory coupled to said processor, said non-volatile memory including a plurality of non-volatile memory segments, each of said non-volatile memory segments having a predetermined address to allow a selective access thereto;

an interface port coupled to said non-volatile memory, said interface port adapted to receive data;

a first circuit for translating a logical address included in a received data into a physical address corresponding to at least one of said predetermined addresses of said plurality of non-volatile memory segments;

a second circuit for selecting one of the plurality of non-volatile memory segments based on said physical address;

a third circuit to update data stored in said one of the plurality of non-volatile memory segments with said received data; and a fourth circuit to configure a display template having a plurality of display sections on a display wherein data stored in said one of the plurality of non-volatile memory segments is displayed on a predetermined display section.

17. The computer system as in claim 16, wherein said interface port is adapted to receive data through an internet.

18. The computer system as in claim 16, wherein said first circuit includes an Address Translation Unit (ATU) to translate said logical address included in said received data into a corresponding one of said predetermined addresses of said plurality of non-volatile memory segments.

19. The computer system of claim 16 wherein said predetermined display section is linked to said one of the plurality of non-volatile memory segments.

20. The computer system of claim 16 wherein said fourth circuit comprises a fourth circuit to configure the display template having the plurality of display sections on the display wherein data stored in said one of the plurality of non-volatile memory segments is displayed on the predetermined display section during a boot period.

* * * * *